United States Patent [19]

Breeden et al.

[11] 4,146,916
[45] Mar. 27, 1979

[54] RADIATION CURED MATERIAL DISPOSED OVER AN ELECTRICAL DEVICE BODY TO HELP MAINTAIN THE CONFIGURATION OF THE BODY AND METHOD

[75] Inventors: William J. Breeden; Godfrey R. Pearce, both of Glasgow, Ky.

[73] Assignee: P. R. Mallory & Co. Inc., Indianapolis, Ind.

[21] Appl. No.: 666,517

[22] Filed: Mar. 12, 1976

Related U.S. Application Data

[63] Continuation of Ser. No. 464,548, Mar. 26, 1974, abandoned.

[51] Int. Cl.² .......................... H01G 9/00; B01J 17/00
[52] U.S. Cl. ..................................... 361/433; 361/271; 29/570
[58] Field of Search .................... 317/230, 242; 29/570

[56] References Cited

U.S. PATENT DOCUMENTS

| | | | |
|---|---|---|---|
| 1,726,343 | 8/1929 | Danziger | 317/230 |
| 2,098,745 | 11/1937 | Georgiev | 317/230 |
| 2,107,780 | 2/1938 | Danziger | 317/230 |
| 3,653,959 | 4/1972 | Kehr | 357/72 |
| 3,753,720 | 8/1973 | Kloczewski | 357/72 |
| 3,869,652 | 3/1975 | Maillot | 317/230 |
| 3,940,667 | 2/1976 | Pearce | 317/230 |

*Primary Examiner*—Andrew J. James
*Attorney, Agent, or Firm*—Hoffmann, Meyer & Coles

[57] ABSTRACT

An electrical device body including an electrode and a radiation semi-cured or cured polymer containing material. The electrode is formed into a configuration such as a convolutely wound electrical device body. The radiation semi-cured or cured polymer containing material is disposed over the body to help maintain the configuration of the body.

A method of making the electrical device body including the steps of applying radiation curable polymer containing material to an electrode formed into a configuration such as a convolutely wound body configuration, irradiating applied material to semi-cure or completely cure the applied material and help maintain the configuration of the body.

High energy irradiation from an energy source such as ultra-violet light or an electron beam is used to crosslink or cure applied polymeric material.

10 Claims, 4 Drawing Figures

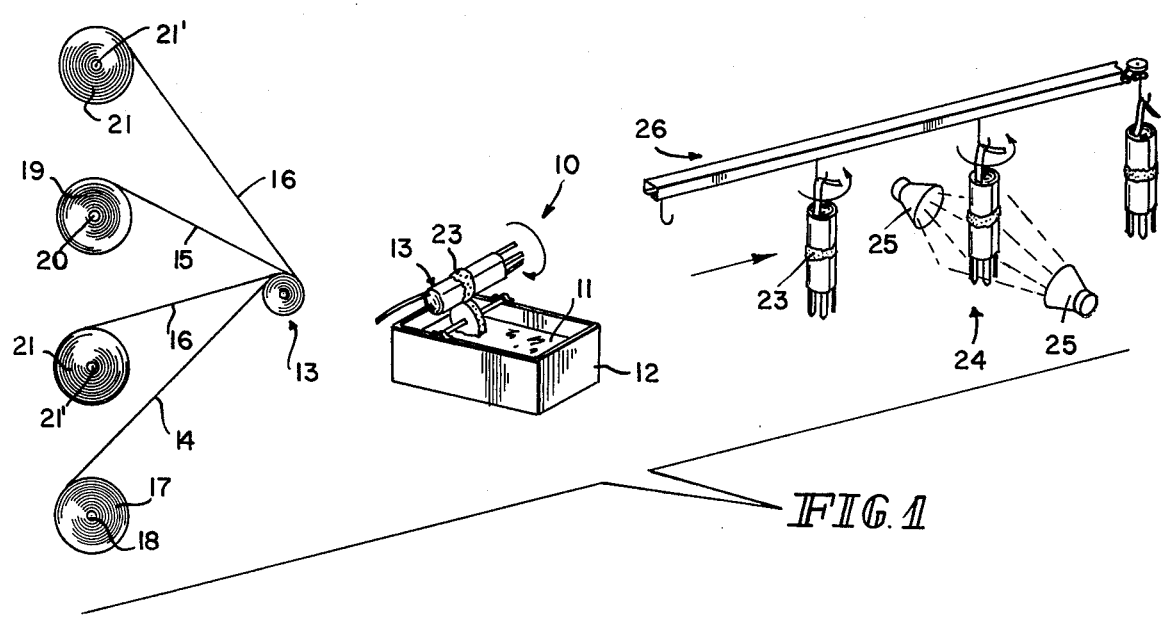
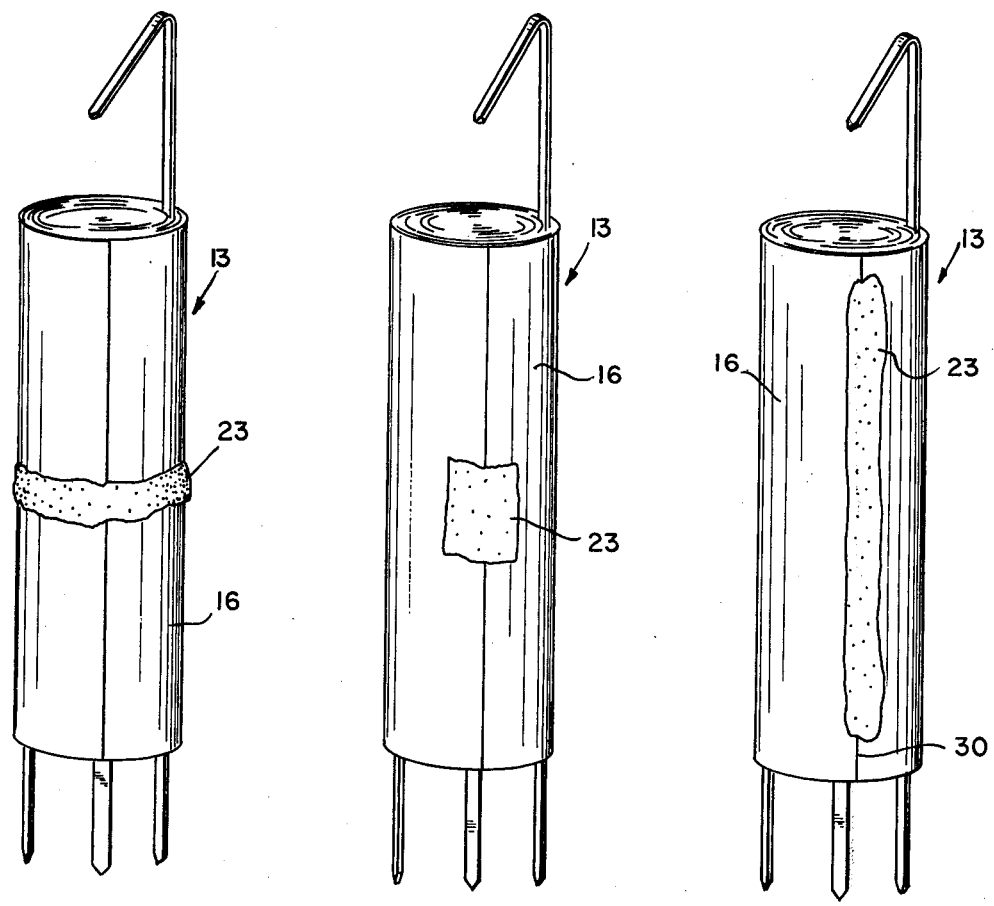
FIG. 2  FIG. 3  FIG. 4

RADIATION CURED MATERIAL DISPOSED OVER AN ELECTRICAL DEVICE BODY TO HELP MAINTAIN THE CONFIGURATION OF THE BODY AND METHOD

This is a continuation of application Ser. No. 464,548, filed Mar. 26, 1974, now abandoned.

The present invention relates to radiation semi-cured or cured polymer containing material disposed over a body including an electrode in such a fashion as to help maintain the configuration of the electrode, and to a method of making the same. More particularly, the invention relates to a convolutely wound electrical device body including radiation semi-cured or completely cured polymer containing material disposed over a convolutely wound electrode or electrodes to help maintain the convolutely wound configuration of the electrical device body, and to a method of making the same.

The electrical device body may be any one of several electrical device bodies such as a capacitor or a battery. The concepts of the present invention have particular applicability to a convolutely wound electrical device requiring the presence of a liquid or semi-liquid electrolyte material.

A typical liquid type electrolytic capacitor includes etched metal containing anode and cathode electrode foils. The metal of the metal containing foils may be any suitable electric film forming metal such as aluminum, tantalum, niobium, titanium, zirconium or the like. The anode electrode foil may or may not have a dielectric metal oxide film formed over its surface. The cathode electrode probably includes a dielectric metal oxide film formed over its surface. Typically, the anode and cathode electrode foils are separated by paper such as Kraft paper. The electrode foils (and interleaved paper) are formed into an electrode configuration such as a convolutely wound relatively tight roll. In addition to electrolytic capacitors, capacitors with a plurality of flat stacked electrode foils may incorporate the concepts herein disclosed.

A rubber band or adhesive containing tape such as, No. 42 Tape made by Minnesota Mining & Manufacturing Company of Minneapolis, Minnesota, U.S.A. has been used to help maintain a convolutely wound configuration of the electrodes used in a capacitor body. U.S. Pat. No. 1,789,949 shows the use of a rubber band to help maintain a convolutely wound electrode configuration of a capacitor body. U.S. Pat. No. 1,726,343 shows the use of a relatively short length of adhesive containing tape to help maintain a convolutely wound electrode configuration of a capacitor body. The paper of the convolutely wound configuration of the capacitor body is impregnated, either before or after rolling, with a suitable electrolyte such as a solution of ammonium borate and boric acid, plus glycol to help lower the freezing point temperature of the solution. The impregnated convolutely wound capacitor body is then inserted into the cavity of a protective metal housing. The housing helps protect the convolutely wound capacitor body and minimize contamination of the capacitor by contact with moisture and the like which may, during operation of the capacitor, have a harmful effect on the electrical characteristics of the capacitor. Typically, the open end of the metal housing is closed by either a glass-to-metal end seal or by an electrically insulating plastic end seal. The end seal is retained by a suitable swaged or rolled-over edged portion of the housing and, if the end seal is of the glass-to-metal type, it is soldered to the swaged or rolled-over portion of the housing. Ideally, the housing for the capacitor body has its open end closed in an atmosphere which is relatively free from harmful contaminants. Prior to closing the open end of the housing, the capacitor body is impregnated with electrolyte.

The use of a rubber band or adhesive containing tape to help maintain the configuration of the capacitor body (or electrodes, as the case may be) presents problems. One problem is that the rubber of the band and the adhesive of the tape or the tape itself, tends to degrade with the passage of time due to prolonged contact with the electrolyte system. The ability of the rubber band or adhesive tape to help retain the configuration of the capacitor body tends to be non-existent, allowing the electrode surfaces of the capacitor body to move relative to each other, thereby probably altering the electrical characteristics such as the power factor and the like of the capacitor body. Furthermore, some rubber and some adhesives, upon prolonged exposure to electrolyte, tend to contaminate the electrolyte system. The use of certain types of adhesives with a capacitor body are restricted due to the type of electrolyte system used with the capacitor body. Some rubber tends to restrict the operation of the electrical device body to about 125° C. because the rubber tends to become less pliable which tends to allow the electrical device body to alter its configuration. Some adhesives begin to lose the desired adhesive property at temperatures of about 125° C. or higher, which in turn tends to allow the electrical device body to alter its configuration. A change in the configuration of the electrical device body will probably have an affect on the electrical characteristics of the electrical device body.

One aspect of the present invention relates to an electrical device body including an electrode, a radiation semi-cured or completely cured polymer containing material, the electrode formed into a configuration, the polymer containing material disposed over an electrode to help maintain the configuration of the electrode, and a liquid or semi-liquid electrolyte contiguous the electrode. The electrical device body may be a capacitor, battery or the like. The present invention has particular applicability to a convolutely wound capacitor body impregnated with an electrolyte of the organic solvent type, glycol type and the like.

The polymeric material is cross-linked or cured by exposure to high energy irradiation such as ultraviolet (UV) light or electron beam (EB) irradiation. An advantage of radiation cured material over a solvent-base type material is the minimization of pollution of the atmosphere by solvent evolved during hardening of solvent base type material. Volatile solvents are not evolved into the atmosphere during radiation curing. Typically, volatile solvents are also highly combustible. Hardening of solvent containing materials generally requires expending large quantities of heat.

Radiation cured materials do not seem to be harmfully degraded upon prolonged contact with electrolyte systems of the type usually associated with capacitors. The use of radiation cured materials to help retain an electrode configuration minimizes problems such as the movement of electrode surfaces with respect to each other which may have a harmful affect on the electrical characteristics of the body, contamination of the electrolyte system continuous the electrode by degradation of rubber or adhesive usually used to help maintain the electrode configuration, the restriction on the maximum upper operating temperature to about 125° C., and on the type of organic solvent containing electrolyte systems usable with the electrical device body.

It is therefore, a feature of the present invention to provide, radiation semi-cured or completely cured polymer containing material disposed over an electrode formed into a configuration to help maintain the configuration of the electrode, and to a method making the same. A further feature of the present invention is to provide a convolutely wound electrical device body including a radiation semi-cured or completely cured polymer material functioning as a means to help maintain the configuration of the convolutely wound body and characterized by its ability not to degrade upon prolonged exposure to electrolyte systems and thereby not harmfully contaminate the electrolyte system. Other features of the invention will be apparent from the drawing, the following description and the appended claims.

In the drawing:

FIG. 1 is a diagrammatic illustration of means for applying radiation cross-linkable polymer material to a convolutely wound electrical device body, means for radiating the material applied to the body to cross-link or cure the material;

FIG. 2 is an illustration of a convolutely wound capacitor body maintained in a convolutely wound configuration by a band of cured polymer containing material disposed over the body;

FIG. 3 is an illustration of a convolutely wound capacitor body maintained in a convolutely wound configuration by a label-like mass of cured polymer containing material disposed over the body; and FIG. 4 is an illustration of a convolutely wound configuration by a mass of cured polymer containing material at the exposed lateral edge of the wound body.

One form of the concepts embodied in the present invention is illustrated in FIG. 1. Illustrated is an applicator means 10 for applying radiation curable material 11 from reservoir 12 to convolutely wound electrical device body 13. The device body 13 includes an anode electrode foil 14 and cathode electrode foil 15 separated by Kraft paper 16. The convolutely wound electrical device body 13 is made by removing lengths of anode electrode foil 14 from a roll 17 of electrode foil 14. Roll 17 is rotatably carried by arbor 18. Cathode electode foil 15 is removed from a roll 19 of cathode electrode foil rotatably carried by arbor 20. Kraft paper 16 is removed from a roll 21 of Kraft paper rotatably carried by arbor 21'. Anode electrode foil 14, Kraft paper 16, and cathode electrode foil 15 are convolutely wound on winding arbor 22 to provide the convolutely wound electrical device body 13.

The convolutely wound electrical device body 13 is removed from winding arbor 22 and a band 23 of radiation hardenable or curable polymeric material 11 is applied to the body. As a matter of convenience and economics, band 23 has a width substantially less than the width of the convolutely wound electrical device body 13. Means 10 for applying the band 23 of radiation curable material to the convolutely wound device body 13 may vary the width of the band. The viscosity of the radiation curable polymeric material may be varied to help control the thickness thereof applied to the electrical device body 13. The means 10 for applying band 23 may be a brush, a wheel applicator, a non-atomized stream ejected from a nozzle and the like. Means 10 illustrated in FIG. 1 is a wheel applicator. The convolutely wound electrical device body 13 is adjacent the applicator means 10 for the length of time to apply desired amounts of material to the electrical device body to provide band 23.

The convolutely wound electrical device body 13 is removed from the application means 10 and the body 13 together with the applied band 23 of radiation curable material is passed through a radiation cross-linking or curing zone 24. Zone 24 includes an ultraviolet light source 25 emitting irradiation capable of causing cross-linking or curing of the band 23 of the material 11 applied to the surface of the electrical device body 13. To help insure complete exposure of the material 11 comprising the band 23 to irradiation from source 25, the convolutely wound body 13 may be turned relative to the source 25 to insure substantially complete exposure of the band 23 to irradiation.

The polymeric material 11 applied to the convolutely wound electrical device body 13 is of the type which does not have a harmful affect on the desired electrical and physical relationship between the electrolyte system (not shown) impregnating the Kraft paper 16 and electrode foils 14 and 15 under operating conditions.

The radiation curable polymeric material 11 applied to the electrical device body 13 may be any one of several suitable radiation cross-linkable or curable polymeric materials that has the property of being tacky, has high strength uncured state, is electrically non-conducting, has good characteristics at 125° C., is not harmfully degraded by the electrolyte during operation of the electrical device body, and is capable of being applied by a brushing, a non-atomizing stream, a rolling, or like technique.

Examples of ultraviolet light curable polymeric materials 11 usable in the present invention are unsaturated polyesters, thermosetting acrylics and urethane alkyds typically mixed with reactive monomers such as styrene, vinyl toluene, or acrylics, and a suitable initiator. In the event electron beam radiation is used to cross-link the applied polymeric material 11, suitable materials may be unsaturated polyesters, thermosetting and thermoplastic acrylics, urethanes and the like. It may be possible to modify the polyesters, acrylics and urethanes with epoxy, vinyl, silicone, fluorcarbon polymers and the like. Typical monomers may include styrene, vinyl toluene, acrylics and the like. In the use of an electron beam to cross-link the applied polymeric material 11, the electron beam bombards the polymer with a high energy electron. A suitable polymer material 11 is marketed by W. R. GRACE & CO., Washington Research Center, 7379 Route 32, Columbia, Maryland, U.S.A. under type designation 4511-1 or 911L.

The following example is illustrative of a convolutely wound electrical device body 13 treated using means of FIG. 1.

EXAMPLE

Etched aluminum cathode electrode foil 15 is unwound from roll 17 at the rate of about 1 inch per second. The cathode electrode foil 15 has a dielectric oxide film of aluminum formed over its surfaces. The cathode electrode foil 15 has a thickness of about 0.0008 to about 0.004 of an inch and a width of about 2 to about 18 inches. The cathode electrode foil 15 is convolutely wound with etched anode foil electrode 14 and Kraft paper 16. The anode electrode foil 14 may or may not include a dielectric oxide film over its surface. The physical dimensions of the anode foil 14 are about the same as those of the cathode foil 15. The width and the length of the Kraft paper is about the same as the width and the length of the electrode foils 14 and 15. The convolutely wound electrical device body 13 has applied to it a band 23 of irradiation curable or hardenable material by means 10.

An example of ultraviolet light cross-linkable or curable material 11 is typed designation 4511-1 marketed by W. R. GRACE & CO. Material 11 is applied as a narrow band of about ¼ to ¾ of an inch wide around and about in the center of the periphery of the convolutely wound electrical device body 11 as shown in FIG. 2.

The convolutely wound electrical device body 13 with its band 23 of applied material is transported by conveyor means 26 to curing or hardening zone 24. In zone 24, the body 13 is irradiated by ultraviolet light having a wavelength of about 3600 to about 3700 Angstrom (A) at a distance of 1 to 3 inches for up to about 1 second. The exposure of the band 23 of polymer material 11 to the ultraviolet light of source 25 while in zone 24 causes what appears to be an almost instantaneous cross-linking or curing of the polymer material 11 and provides the device body 13 with a substantially uniform and continuous band 23 having a thickness of about 0.002 inches. The layer is relatively clear and has a good electrolyte resistance to degradation when contacted by an electrolyte system. The convolutely wound electrical device body 13 with its cured band 23 is immersed in an electrolyte of ammonium borate, boric acid and glycol for about 1 to about 3 seconds to impregnate the body with an electrolyte. It is to be understood that the paper 16 can be impregnated with electrolyte prior to winding with electrode foils 14 and 15, during winding, or subsequent to winding but prior to application of band 23.

The concepts of the present invention appear to be applicable to battery bodies as well as to capacitor bodies. The capacitor body may be a convolutely wound capacitor body of the type discussed hereinbefore as well as a stacked foil type capacitor body (not shown). The stacked foil type capacitor body includes a plurality of flat anode and cathode foil electrodes separated by Kraft paper. A band (not shown) of irradiation cured material 11 is applied about the stack foil type capacitor body and cured as set forth in the example.

In lieu of applying a continuous band 23 of material 11 around the periphery of the electrical device body 13, a band 23 that extends only partially around the body may be used. For example, cured material 11 may extend only over that portion of the electrical device body 13 sufficient to maintain the device body in its configuration as shown in FIG. 3 of the drawing. Alternatively, the cured material 11 may be applied to the lateral edge 30 of the convolutely wound capacitor body 13 as shown in FIG. 4 of the drawing.

It is to be understood that with the proper material 11, electron beam curing or hardening may be used in lieu of ultraviolet light curing of the material 11.

We claim:

1. An electrical device body including an electrode and polymer containing material at least radiation semi-cured, the electrode formed into a configuration, the polymer containing material disposed over at least a portion of the electrode to help maintain the configuration of the electrode.

2. The electrical device body of claim 1, wherein the body includes a convolutely wound electrode.

3. The electrical device body of claim 2, wherein the width of the polymer containing material is less than the length of the body.

4. The electrical device body of claim 3, wherein and width of the polymer containing material is less than the circumference of the body.

5. The electrical device of claim 1, wherein the body is a capacitor body.

6. The electrical device of claim 1, wherein the body includes convolutely wound electrodes and the polymer material is either a band around the body, or a band partially around the body, or a length of material along the lateral edge of one of the electrodes at the periphery of the body.

7. A capacitor body including convolutely wound electrodes and a length of material at least radiation semi-cured disposed at the periphery of the body to help maintain the body as a convolutely wound body.

8. A method of making the electrical device body of claim 1, including the steps of forming the electrode into a configuration, applying irradiation curable material to the periphery of the electrode, and irradiating the material to at least semi-cure the material, the material helping to maintain the configuration of the electrode.

9. A method of making the capacitor of claim 7, including the steps of convolutely winding electrodes, applying a length of irradiation curable material to the periphery of the convolutely wound electrodes, irradiating the material to at least semi-cure the material, the material helping to maintain the convolutely wound configuration.

10. The method of claim 9, including the further step of providing the body with an electrolyte.

* * * * *